(12) United States Patent
Doering (10) Patent No.: US 8,352,146 B2
(45) Date of Patent: Jan. 8, 2013

(54) ENGINE RESPONSE ADJUSTMENT BASED ON TRAFFIC CONDITIONS

(75) Inventor: Jeff Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1125 days.

(21) Appl. No.: 11/559,051

(22) Filed: Nov. 13, 2006

(65) Prior Publication Data

US 2008/0114521 A1 May 15, 2008

(51) Int. Cl.
- *B60T 7/12* (2006.01)
- *G05D 1/00* (2006.01)
- *G06F 7/00* (2006.01)
- *G06F 17/00* (2006.01)

(52) U.S. Cl. .......................................... 701/96
(58) Field of Classification Search ............... 701/1, 70, 701/93, 96, 300
See application file for complete search history.

(56) References Cited

U.S. PATENT DOCUMENTS

| | | | |
|---|---|---|---|
| 4,853,720 A * | 8/1989 | Onari et al. ................... 701/110 |
| 4,996,965 A * | 3/1991 | Onari et al. ................... 123/492 |
| 5,048,495 A * | 9/1991 | Onari et al. ................... 123/492 |
| 5,162,997 A * | 11/1992 | Takahashi ......................... 701/1 |
| 5,163,402 A | 11/1992 | Taguchi et al. |
| 5,200,900 A * | 4/1993 | Adrain et al. ................... 701/115 |
| 5,293,317 A * | 3/1994 | Adrain et al. ................... 701/115 |
| 5,446,665 A * | 8/1995 | Adrian et al. ................... 701/102 |
| 5,638,790 A * | 6/1997 | Minowa et al. ................ 123/436 |
| 5,724,944 A * | 3/1998 | Minowa et al. ................ 123/436 |
| 5,947,087 A * | 9/1999 | Minowa et al. ................ 123/399 |
| 6,016,457 A * | 1/2000 | Toukura et al. .................. 701/70 |
| 6,032,646 A * | 3/2000 | Minowa et al. ................ 123/396 |
| 6,044,318 A * | 3/2000 | Bourdon et al. ................. 701/65 |
| 6,076,622 A * | 6/2000 | Chakraborty et al. ......... 180/169 |
| 6,202,021 B1 * | 3/2001 | Kresse et al. .................... 701/93 |
| 6,260,539 B1 * | 7/2001 | Minowa et al. ................ 123/478 |
| 6,401,694 B2 * | 6/2002 | Minowa et al. ................ 123/478 |
| 6,526,344 B2 * | 2/2003 | Tamura et al. ................... 701/70 |
| 6,543,422 B2 * | 4/2003 | Minowa et al. ................ 123/478 |
| 6,902,512 B2 * | 6/2005 | Kamichi et al. ............... 477/108 |
| 7,603,228 B2 * | 10/2009 | Coughlin ....................... 701/123 |
| 2003/0176256 A1 * | 9/2003 | Kamichi et al. ................... 477/5 |
| 2005/0143221 A1 * | 6/2005 | Kuwahara et al. ............... 477/97 |
| 2005/0159876 A1 * | 7/2005 | Sugano ........................... 701/96 |
| 2007/0276582 A1 * | 11/2007 | Coughlin ....................... 701/123 |

* cited by examiner

*Primary Examiner* — Khoi Tran
*Assistant Examiner* — Harry Oh
(74) *Attorney, Agent, or Firm* — Julia Voutyras; Alleman Hall McCoy Russell & Tuttle LLP (57) ABSTRACT

A method for controlling an engine of a vehicle in response to an operator input, comprising, during a first non-cruise control condition and at first distance to a forward vehicle, adjusting engine output in response to said operator input with a first relationship; and during a second non-cruise control condition and at a second, greater, distance to a forward vehicle, adjusting engine output in response to said operator input with a second relationship different from said first.

14 Claims, 6 Drawing Sheets

Variation in Pedal Mapping for Varying Forward Distance During Non-Cruise Conditions

ENGINE RESPONSE ADJUSTMENT BASED ON TRAFFIC CONDITIONS

BACKGROUND AND SUMMARY

Vehicles systems receive various operator commands in order to facilitate operator control of the powertrain, including an accelerator foot pedal input. Further, the relationship between the amount of operator depression and the powertrain response can be tuned to provide different drive feel and performance, and can be adjusted based on various engine or vehicle operating conditions. However, there may be conflicting goals in tuning the pedal relationship to vehicle output response based on numerous factors.

For example, a higher gain relationship may be desired for some lower pedal depression and/or lower vehicle speed conditions to provide a more "peppy" vehicle feel. This can be especially true when a vehicle is designed with a more underpowered powertrain in order to increase fuel economy and/or reduce emissions. In other words, a smaller engine and/or otherwise adjusted transmission may provide improved fuel economy, but may feel sluggish during acceleration driver tip-ins from lower speeds.

On the other hand, a lower gain relationship may be desired for other lower pedal depression and/or lower vehicle speed conditions to provide finer engine and/or vehicle output torque control to give the operator improved ability in torque selection and adjustment. This can be especially true during driving maneuvers under increased traffic conditions and/or during maneuvers such as vehicle parking or traversing rough terrain.

These and other issues may be at least partially resolved by adjusting a relationship between pedal input and vehicle output using an indication of environmental and/or traffic conditions. For example, by considering a distance to a forward vehicle indicative of vehicle traffic conditions, the gain may be adjusted to enable both a peppy feel during lower traffic conditions and a finer torque selection during higher traffic conditions. The distance to a forward vehicle may be provided by information already available in some adaptive cruise control systems, and thus such information may advantageously be used even during non-cruise control conditions.

Likewise, a driver may also provide some selectivity based on a desired fuel economy performance, such as through a driver selectable fuel economy switch, as to how the gain is adjusted in response to such information, thereby providing gain adjustment that is more sensitive to driver needs and/or goals. In one embodiment, by integrating gain adjustment using both environmental information and driver selectable fuel economy information, it may be possible to provide improved drivability over a variety of conditions while providing the operator with desired fuel economy performance in a smooth and coordinated way.

Note that the relationship between driver pedal input and vehicle and/or engine output may be adjusted in a variety of ways, including gradually adjusting the relationship over time, as well as further adjusting the relationship based on various operating parameters such as engine speed, vehicle speed, gear ratio, etc. Further, gain adjustment may include adjusting software-based transfer functions, algorithms, analog circuitry, signal processing, and/or combinations thereof.

DETAILED DESCRIPTION

Figure 1:
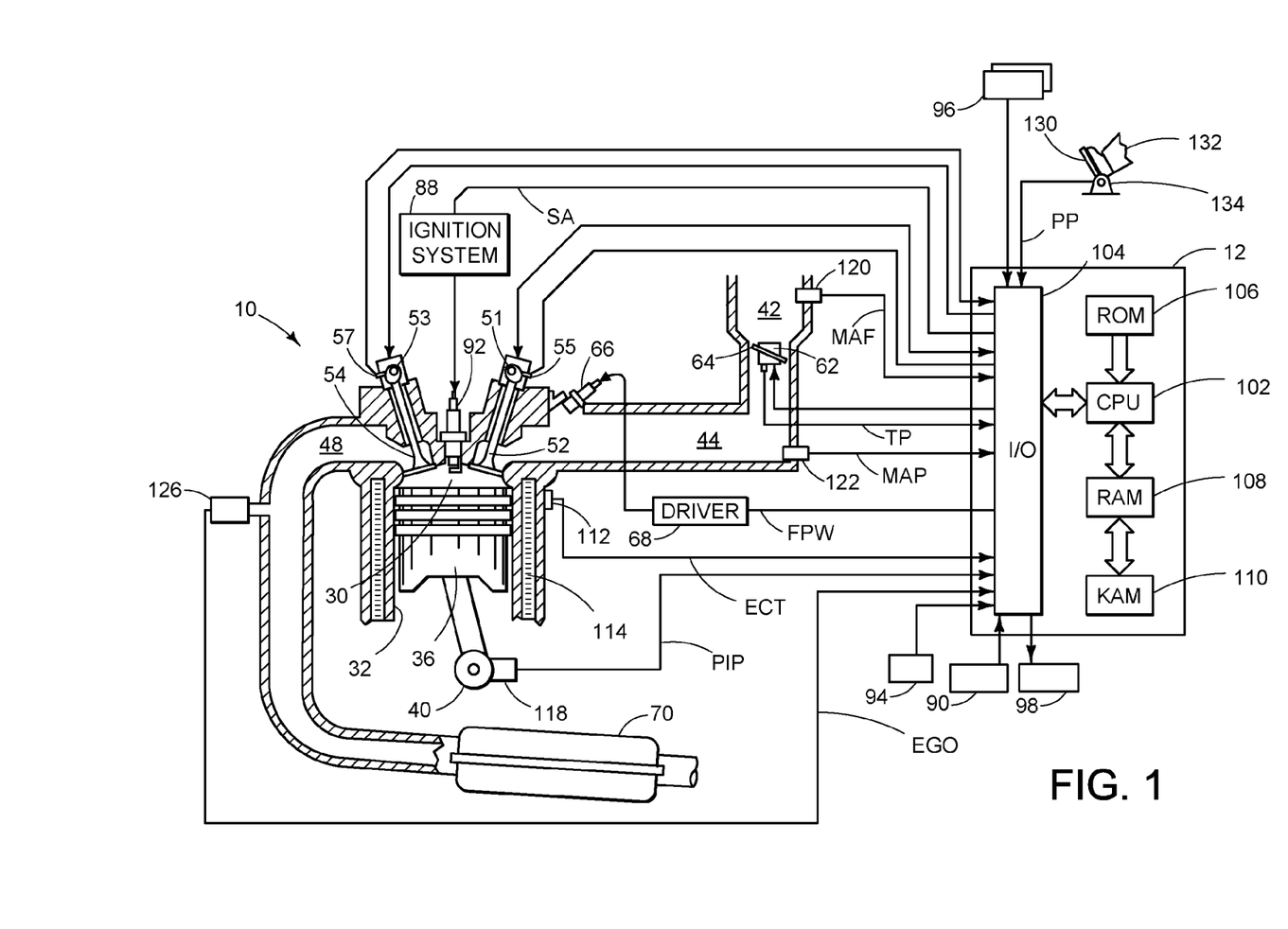
FIG. 1 is a schematic depiction of an exemplary embodiment of an engine according to the present disclosure.

FIG. 1 shows a schematic diagram of one cylinder of multi-cylinder internal combustion engine 10. Combustion chamber or cylinder 30 of engine 10 is shown including combustion chamber walls 32 and piston 36 positioned therein and connected to crankshaft 40. A starter motor (not shown) may be coupled to crankshaft 40 via a flywheel (not shown). Cylinder 30 may communicate with intake port 44 and exhaust port 48 via respective intake valve 52 and exhaust valve 54. Intake valve 52 and exhaust valve 54 may be actuated via intake camshaft 51 and exhaust camshaft 53. Further, the position of intake camshaft 51 and exhaust camshaft 53 may be monitored by intake camshaft sensor 55 and exhaust camshaft sensor 57 respectively. Intake and/or exhaust valve control may also be provided by signals supplied by controller 12 via electric valve actuation (EVA). Additionally intake and exhaust valves may be controlled by various other mechanical control systems including cam profile switching (CPS), variable cam timing (VCT), variable valve lift (VVL), and/or variable valve timing (VVT). In some embodiments, a valve control strategy may include a combination of two or more of the above mentioned control techniques. While cylinder 30 is shown having only one intake valve and one exhaust valve, it should be appreciated that in some embodiments cylinder 30 may have two or more intake and/or exhaust valves.

Fuel injector 66 is shown coupled to intake port 44 for delivering injected fuel in proportion to the pulse width of signal FPW received from controller 12 via electronic driver 68. Fuel may be delivered to fuel injector 66 by a fuel system (not shown) including a fuel tank, fuel pumps, and a fuel rail. Engine 10 is described herein with reference to a gasoline burning engine, however it should be appreciated that in some embodiments, engine 10 may be configured to utilize a variety of fuels including gasoline, diesel, alcohol, and combinations thereof.

Intake port 44 is shown communicating with intake manifold 42 via throttle plate 64. Further, throttle plate 64 may be coupled to electric motor 62 such that the position of throttle plate 64 may be controlled by controller 12 via electric motor 62. Such a configuration may be referred to as electronic throttle control (ETC), which may be utilized during idle speed control as well.

Distributorless ignition system 88 may provide ignition spark to combustion chamber 30 via spark plug 92 in response to spark advance signal SA from controller 12. Though spark ignition components are shown, engine 10 (or a portion of cylinders thereof) may not include spark ignition components in some embodiments and/or may be operated without requiring a spark.

Engine 10 may provide torque to a transmission system (not shown) via crankshaft 40. Crankshaft 40 may be coupled to a torque converter which is also coupled to a transmission via a turbine shaft. Torque converter may include a bypass, or lock-up clutch. The lock-up clutch may be actuated electrically, hydraulically, or electro-hydraulically, for example. The transmission may comprise an electronically controlled transmission with a plurality of selectable discrete gear ratios. Alternatively, in some embodiments, the transmission system may be configured as a continuously variable transmission (CVT), or a manual transmission.

Exhaust gas sensor 126 is shown coupled to exhaust port 48 upstream of catalytic converter 70. It should be noted that sensor 126 may correspond to a plurality of various different sensors and catalytic converter 70 may correspond to a plurality of various emissions devices positioned in the exhaust, depending on the exhaust configuration. Sensor 126 may be a sensor for providing an indication of exhaust gas air/fuel ratio such as an exhaust gas oxygen (EGO) sensor, linear oxygen sensor, an UEGO, a two-state oxygen sensor, a HEGO, or an HC or CO sensor. For example, a higher voltage state of signal EGO indicates that exhaust gases may be rich of stoichiometry and a lower voltage state of signal EGO indicates that exhaust gases may be lean of stoichiometry. Further, signal EGO may be used during air/fuel control in order to estimate and validate various aspects of a desired engine control mode.

As described above, FIG. 1 merely shows one exemplary cylinder of a multi-cylinder engine, and that each cylinder has its own set of intake/exhaust valves, fuel injectors, spark plugs, etc. Furthermore, although the above described engine is shown with a port injection configuration, it should be appreciated that an engine may be configured to inject fuel directly into the cylinders.

Controller 12 is schematically shown in FIG. 1 as a microcomputer, including microprocessor unit (CPU) 102, input/output ports 104, an electronic storage medium, (ROM) 106, random access memory (RAM) 108, keep alive memory (KAM) 110, and a data bus. Controller 12 is shown receiving various signals from sensors coupled to engine 10, in addition to those signals previously discussed, including measurement of inducted mass air flow (MAF) from mass air flow sensor 120 coupled to intake manifold 42; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor in electronic motor 64; and absolute Manifold Pressure Signal MAP from sensor 122. A pedal position indication (PP) may be determined by a pedal position sensor 134 that senses the angle of pedal 130 according to driver input 132. Engine speed signal RPM may be generated by controller 12 from signal PIP and manifold pressure signal MAP from a manifold pressure sensor provides an indication of vacuum, or pressure, in the intake manifold. Controller 12 may control the amount of fuel delivered by fuel injector 66 so that the air/fuel mixture in cylinder 30 may be selected to be at stoichiometry, a value rich of stoichiometry or a value lean of stoichiometry. In some embodiments, controller 12 may control the amount of fuel vapors purged into the intake port via a fuel vapor purge valve (not shown) communicatively coupled thereto. Further, in some embodiments, engine 10 may include an exhaust gas recirculation (EGR) system that routes a desired portion of exhaust gas from exhaust port 48 to intake port 44 via an EGR valve (not shown). Alternatively, a portion of combustion gases may be retained in the combustion chambers by controlling exhaust valve timing.

Controller 12 may also perform cruise control operations when set by the vehicle operator. In one example, the system may include Intelligent Cruise Control (ICC, which may also be referred to as Adaptive Cruise Control, ACC) operation in which throttle operation and vehicle speed control, as well as brakes of a vehicle braking system 98, may be controlled in response to various operating parameters. In one example embodiment, the operator may set a desired vehicle speed and activate the cruise control system via coordinated action of pedal 130 and/or cruise control input devices 96. Then, the system may adjust engine output (e.g., via throttle plate 64, spark timing of plug 92, air-fuel ratio, etc.) and/or transmission states to maintain the desired vehicle speed. Further, the desired vehicle speed or vehicle operation may be interrupted in response to a distance between another vehicle or other object in front of the vehicle measured by distance sensor 94. Sensor 94 may use radar, sonar, laser measurements, or various other approaches to obtain a measure of distance to a forward vehicle or other object. Further, sensor 94 may also provide an indication of the speed of a forward vehicle, as well as its distance away. As such, the vehicle control system may intentionally reduce engine output and/or adjust transmission operation to reduce vehicle speed below the operator speed set-point when distance to a forward vehicle becomes less than a minimum value. Further, the system may use a combination of distance, vehicle speeds (e.g., forward vehicle speed and speed of the vehicle being controlled), and various other conditions to adjust or reduce vehicle speed and/or engine output torque.

However, in addition cruise control operation, information about the traffic conditions of the vehicle (such as the distance to a forward vehicle) may also be used to adjust operation during non-cruise control conditions. In one example, the distance to a forward vehicle may be used to adjust the engine torque response to operator pedal inputs during low speed operating conditions. For example, during low speed vehicle operation where a forward vehicle is less than a selected distance away, the sensitivity of engine torque response to pedal depression may be de-tuned to allow greater operator control and resolution of engine or vehicle output torque.

In another example, the distance to a forward vehicle, as well as the rate of change of the distance may be used with other inputs to estimate driving conditions. For example, stop-and-go city driving may be distinguished from highway or freeway cruising by using a combination of inputs, such as, for example, steering wheel angle and/or activity, pedal and/or brake actuation frequency and amplitude, vehicle speed, distance to a forward vehicle, speed of a forward vehicle, etc. Then, during selected conditions, the sensitivity of engine torque response to pedal depression may be adjusted to allow greater operator control and resolution of engine or vehicle output torque during city stop-and-go driving as compared with higher speed steady speed operation.

In yet another embodiment, the amount of adjustment to the gain between pedal actuation and engine/vehicle output may be further based on a driver mode setting, such as a fuel economy mode or performance mode set by operator input device 90. While in one example only two modes may be selected, in another example, a plurality of modes ranging from economy to performance may be selected. In one example, the pedal gain may be de-tuned during the economy mode compared to the performance mode to a greater extent (or only) when a minimum measured distance to a forward vehicle is reached.

Further still, various other examples of system operation are described herein. In particular, additional details of control routines are included below which may be used with various engine configurations, such as those described in FIG. 1. As will be appreciated by one of ordinary skill in the art, the specific routines described below in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated acts or functions may be repeatedly performed depending on the particular strategy being used. Further, these figures may graphically represent code to be programmed into the computer readable storage medium in controller 12.

Figure 2:
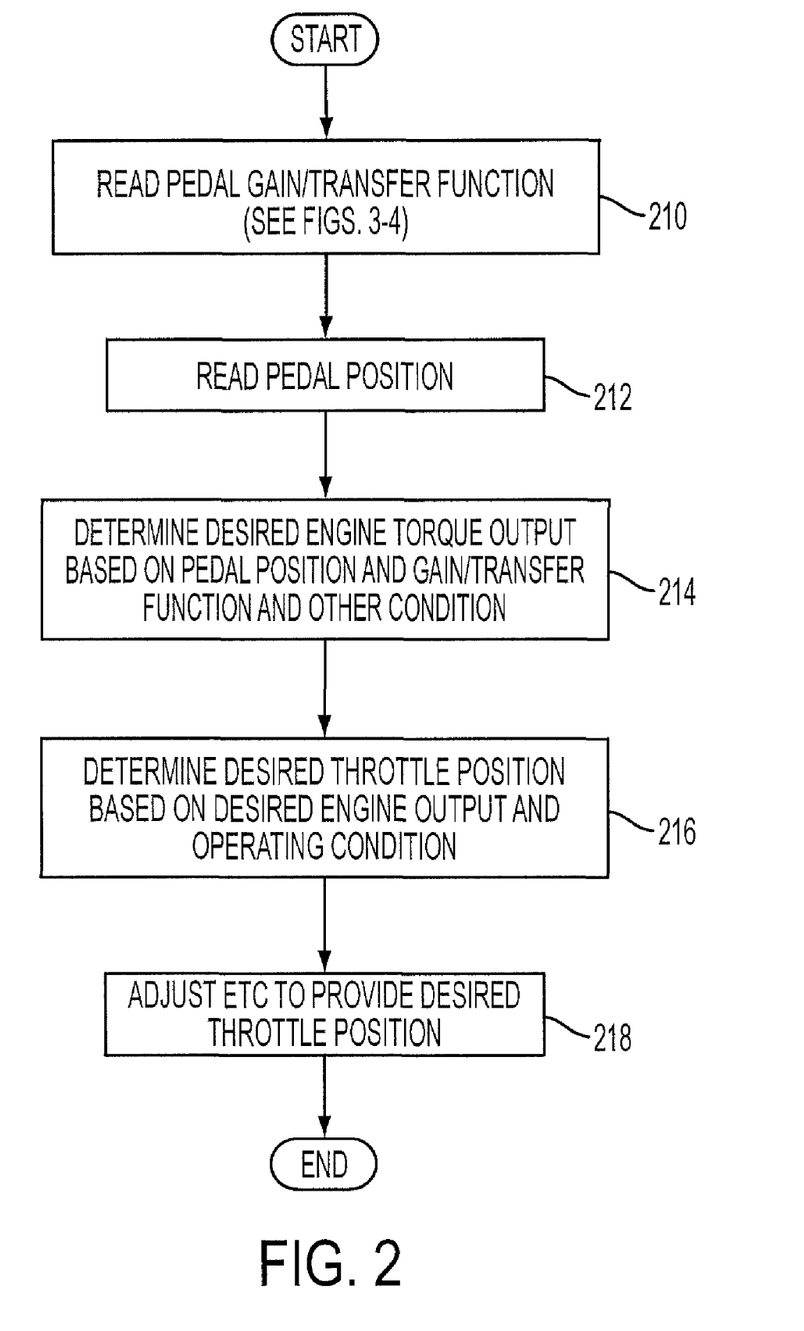
FIGS. 2-4 are example flow diagrams of various actions that may be performed.
Figure 3:
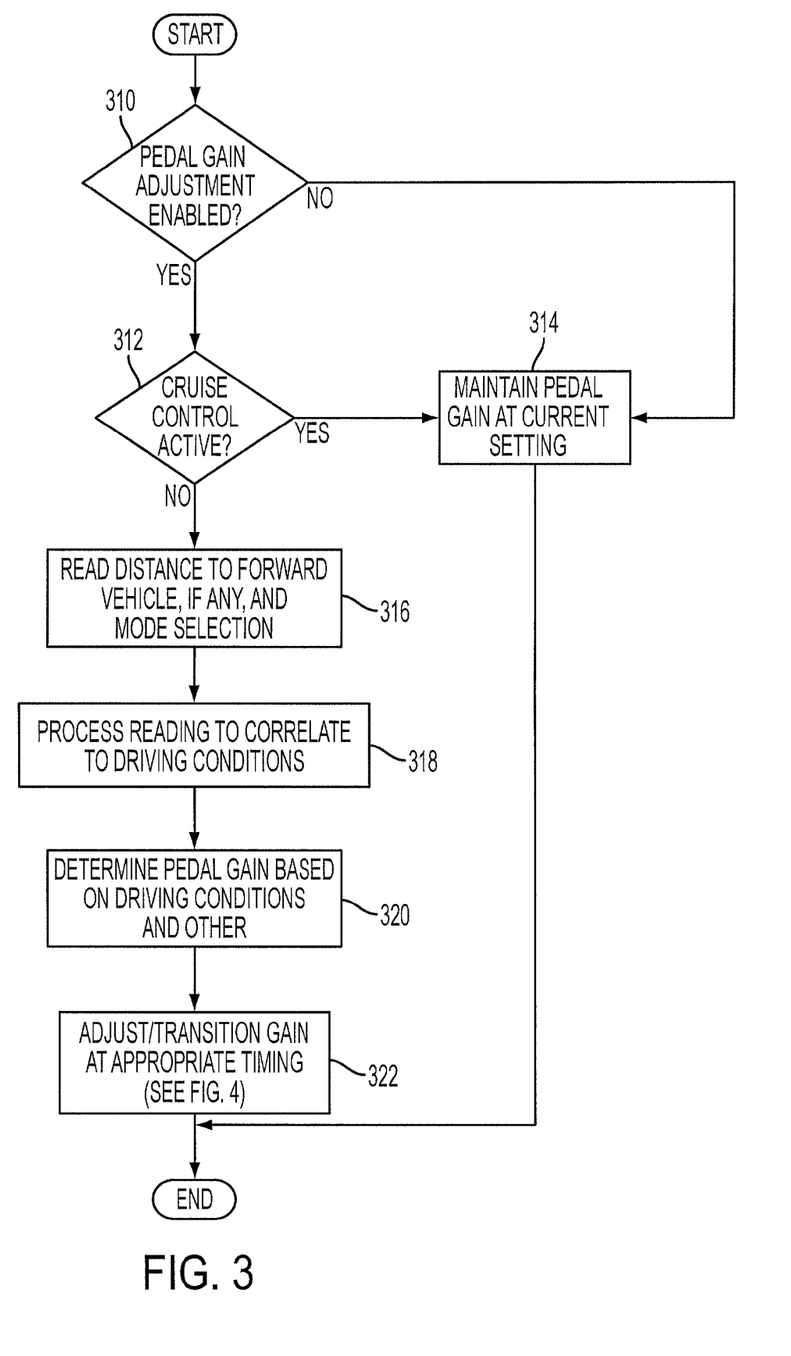
Figure 4:
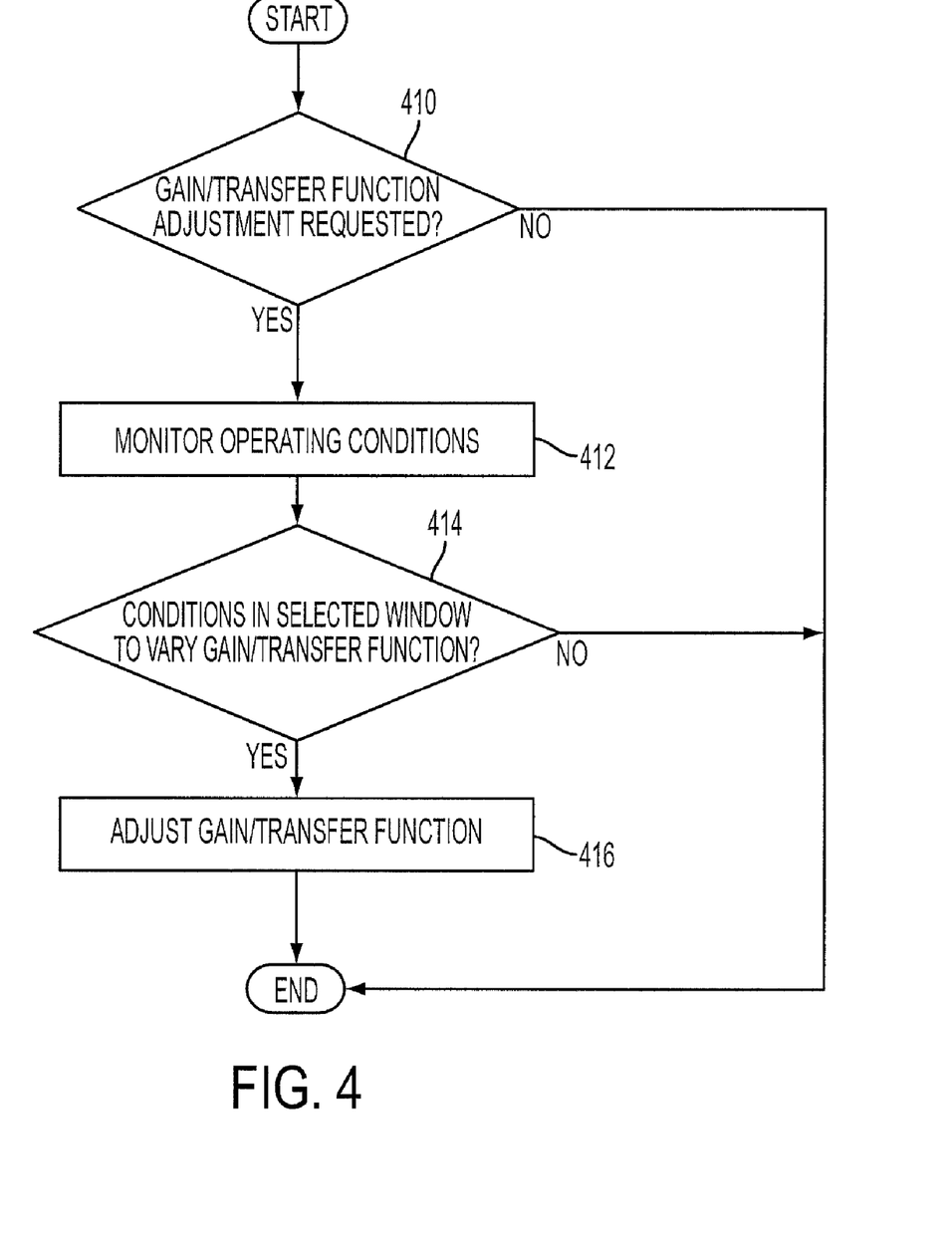

FIGS. 2-4 show flow diagrams depicting a method for controlling engine operation in response to driver pedal actuation during both cruise control conditions and non-cruise control conditions.

Referring now to FIG. 2, a routine is described for adjusting engine output via an adjustable relationship with pedal actuation. First, in 210, the routine reads the selected or current relationship between pedal depression and a desired engine and/or vehicle output, which may include a desired torque, acceleration, speeds, or combination thereof. Further details of the determination, selection of, and/or adjustment of the relationship are described with regard to FIGS. 3-4. While various relationships may be used, the routine may use a transfer function to map pedal depression to desired output across various operating conditions. Further, in addition or in an alternative, a pedal gain function may be as or to adjust a relationship between pedal input and the output.

Continuing with FIG. 2, in 212 the routine reads a current pedal position as actuated by the vehicle operator. For example, the routine may read the current pedal position depression (PP) from sensor 34. Input filtering, noise filtering, and/or other signal processing may also be used to process the pedal depression reading.

Next, in 214, the routine determines the desired engine output torque based on the pedal position of 212. Further, various other operating parameters may be used to determine the desired engine torque such as, for example, engine speed, vehicle speed, barometric pressure, ambient temperature, gear ratio, and/or race other parameters. Next, in 216, the routine determines the desired throttle position based on the desired engine output torque and current operating conditions. In one particular example, the routine may determine desired throttle position based on the desired engine torque, engine speed, and engine coolant temperature. While the throttle is used in this example to adjust engine output torque, various other engine actuators may be used. For example, alternative or additional actuation may be used to adjust engine torque, such as, for example, valve events, valve lift, boosting, valve timing, fuel mass and air-fuel ratio, spark timing, injection timing, or combinations thereof can be used.

Then, in 218, the routine adjusts the electronic throttle to arrive at the desired throttle position. In this way, the engine throttle may be adjusted in response to the operator command taking into account current and various other operating conditions using the selected mapping of 210.

Various other approaches may also be used to adjust engine output and/or engine throttle angle. In one example alternative embodiment, the routine may identify a desired throttle position directly in response to the pedal position and relationship of 210.

In either case, the routine electronically controls the throttle position in response to the operator pedal actuation to provide a desired response characteristic via the gain/transfer function 210. As described herein, various adjustments to the gain/transfer function may be used based on various conditions, including the distance to a forward vehicle. Such operation may be used to enable higher gain during less congested traffic conditions to provide improved driver perception of engine performance, while enabling a reduced gain during higher traffic congestion to enable greater engine output torque and/or vehicle output torque resolution for the operator.

Referring now specifically to FIG. 3, a routine is described for determining whether and how to adjust the gain/transfer function between the pedal position and the desired torque or desired throttle position. First, in 310, the routine determines whether pedal gain/transfer function adjustment is enabled. In one example, gain adjustment may be enabled during selected conditions, such as during low vehicle speed and/or low engine speed conditions (e.g., speeds below a threshold value). Alternatively, pedal gain adjustment may be enabled after a vehicle warm-up condition, such as after engine coolant temperature has reached a threshold value. Further, various other conditions may be utilized to enable pedal gain adjustment.

When the answer to 310 is yes, the routine continues to 312 to determine whether cruise control is activated. For example, the routine may determine whether a cruise control system is enabled via a user selectable switch such as 96. Alternatively, the routine may determine whether a cruise control system is in an ON state. Further still, the routine may determine whether cruise control is currently overriding or adjusting engine torque and/or vehicle speed to provide a desired vehicle speed set by the vehicle operator. In one particular example, the routine determines whether an operator is currently overriding a cruise control set point, or whether the cruise control system has been disabled by the vehicle operator. When the cruise control system is active, the routine continues to 314 to maintain the current pedal gain/transfer function at its current setting. Otherwise, when the answer to 312 is no, the routine continues to 316.

In 316 through 322, the routine utilizes sensors and/or other information from the cruise control system to adjust the pedal gain/transfer function to provide improved vehicle drivability and performance during non-cruise control conditions. First in 316, the routine reads a distance to a forward vehicle, if any, and a current mode selection. For example, the routine may read a performance and/or fuel economy mode selected via driver selectable switch 90. Further, the routine may read a distance to a forward vehicle from sensor 94. Next, in 318, the routine processes the readings 316 and other operating conditions to correlate these to an estimate of current driving environment conditions. For example, the routine may estimate whether current conditions represent city stop-and-go driving conditions, or alternative driving conditions. As noted herein, the routine may further include information other than or in addition to the distance to a forward vehicle and a current mode selection, including a number of actuations of the vehicle pedal and/or brakes, steering angle, steering and/or braking history, vehicle speed, and/or various other conditions. Next, in 320, the routine determines the pedal gain/transfer function based on the driving conditions and other operating inputs. For example, the routine may de-tune one or more regions of the gain/transfer function between pedal position and the desired torque or throttle position in response to the distance to a forward vehicle, a driver mode selection, and/or various operating conditions including vehicle speed, engine speed, etc. Then, in 322, the routine adjusts/transitions the gain/transfer function at an appropriate timing or condition and in an appropriate manner as described down below herein with further reference to FIG. 4.

In this way, it is possible to adjust the driver's perceived performance of the vehicle via an engine output to pedal actuation relationship based on various conditions including traffic congestion, vehicle speed, and various others.

Referring now to FIG. 4, an example routine for transitioning/adjusting the pedal gain/transfer function is described. First, in 410, the routine determines whether an adjustment has been requested/determined. If so, the routine continues to 412 to monitor operating conditions. Then, in 414 the routine determines whether conditions are within a selected window to vary the gain/transfer function. In one example, the routine may determine whether the pedal is at a closed pedal (released) position, as it is possible to vary the gain/transfer function during such a condition with reduced driver perception. In another example, the routine may determine whether sufficient modulation of the pedal by the operator is being performed. In still another example, the routine may monitor vehicle speed and engine speed conditions to enable adjustment of the gain during lower speed conditions. Further still, various other selected windows may be used to vary the gain/transfer function.

If such conditions are identified in 414, the routine continues to 416 to adjust the gain/transfer function. In one example, the gain/transfer function may be adjusted over a predetermined time or number of engine operating cycles. For example, a filtering may be used to provide slower variation in adjustment of the throttle response in response to the gain/transfer function adjustment. In this way, the pedal gain can be adjusted in a selected way during selected conditions to enable improved driver performance.

Figure 5:
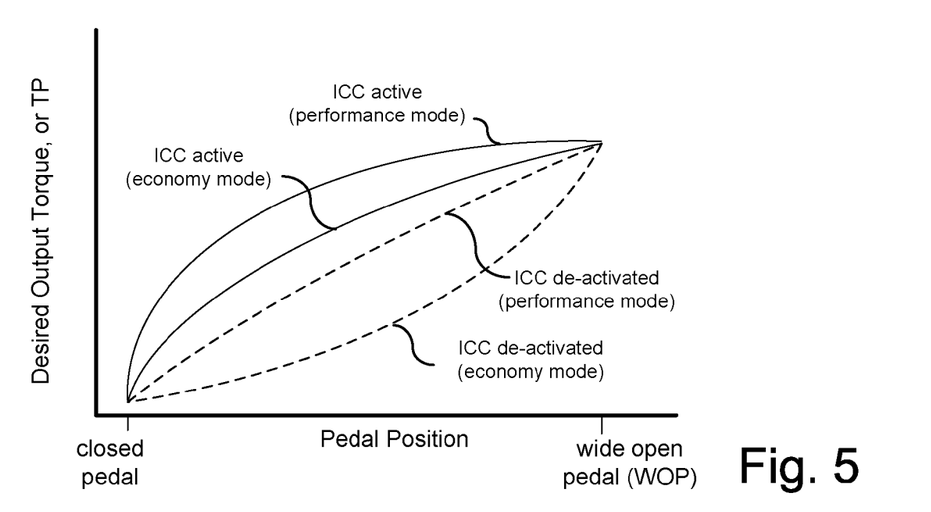
FIGS. 5-8 are graphs illustrating various performance impacts over various operating conditions of pedal gain adjustments and driver selectable fuel economy modes.

Referring now to FIG. 5, an example graph illustrates different variations in the pedal mapping for operating modes, including a driver selected performance/economy mode and/or the ICC mode. In this example, different initial gains are provided for ICC operation and non-ICC operation, as well as different initial gains for the performance/economy mode selected. As noted herein, these gains may be further adjusted based on driving conditions, such as a distance to a forward vehicle, vehicle speed, and/or traffic conditions.

Figure 6:
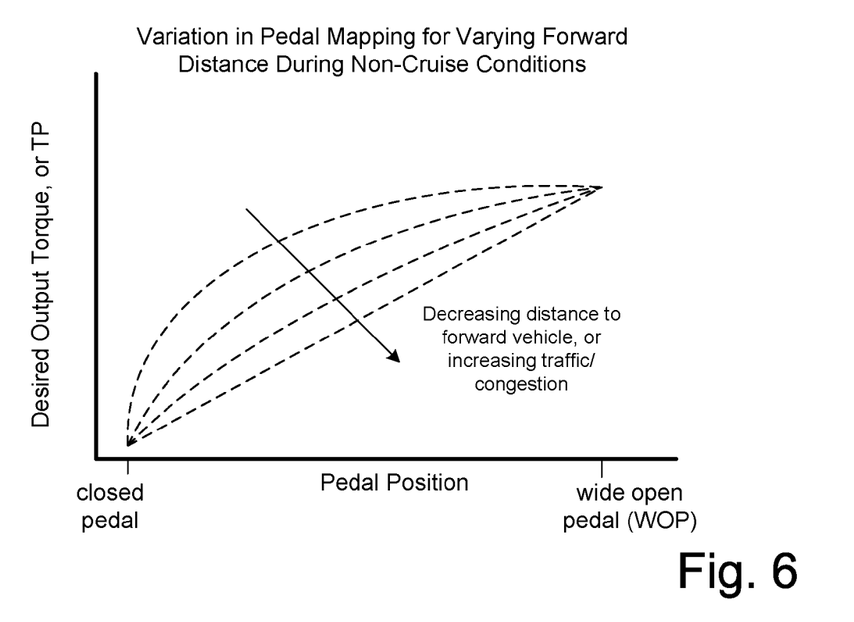

In particular, referring now to FIG. 6, an example graph illustrates variation in the pedal mapping in one particular mode for varying traffic conditions, in particular, for varying distance to a forward vehicle. Specifically, FIG. 6 shows an example transfer function between pedal position (from closed pedal to wide-open pedal) to desired engine output torque or throttle position. As shown, at higher distances to a forward vehicle (e.g., no forward vehicle or reduced traffic at higher vehicle speeds) during lower pedal positions a higher gain is provided (e.g., a greater slope at lower pedal position than higher pedal positions). However, as the traffic increases, or the distance to a forward vehicle decreases, and/or vehicle speed decreases, the gain at lower pedal positions decreases while the gain at higher pedal positions increases. In this way, a substantially continuous relationship between closed pedal and wide-open pedal can be maintained while still providing variable gain.

Figure 7:
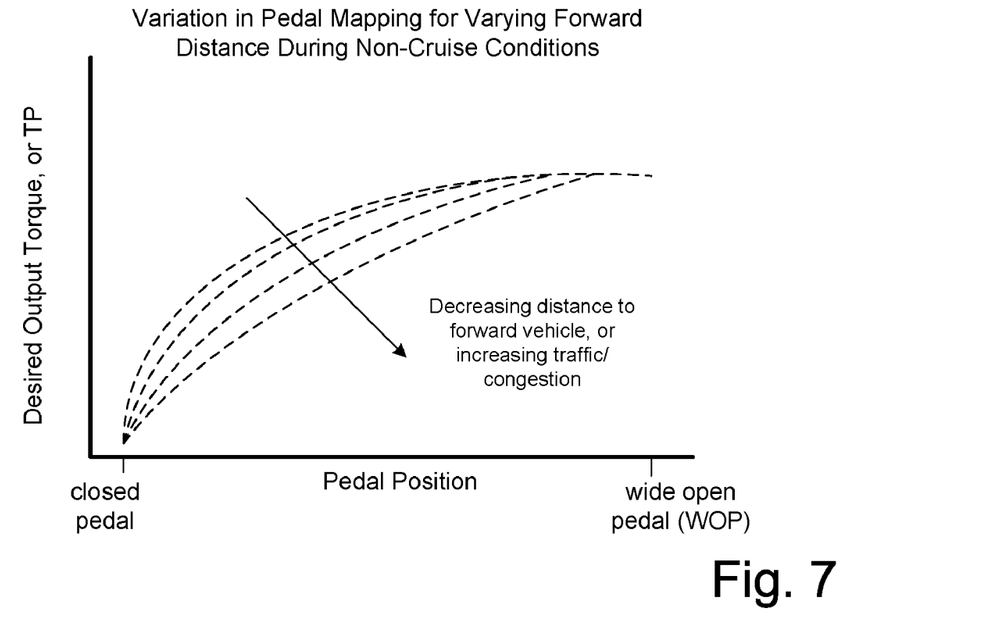

However, note that in an alternative embodiment, shown in FIG. 7, the gain may be varied in a specified region as well. Specifically, greater adjustment (e.g., de-tuning) may be provided at lower pedal positions while providing a more consistent response at higher pedal positions.

Figure 8:
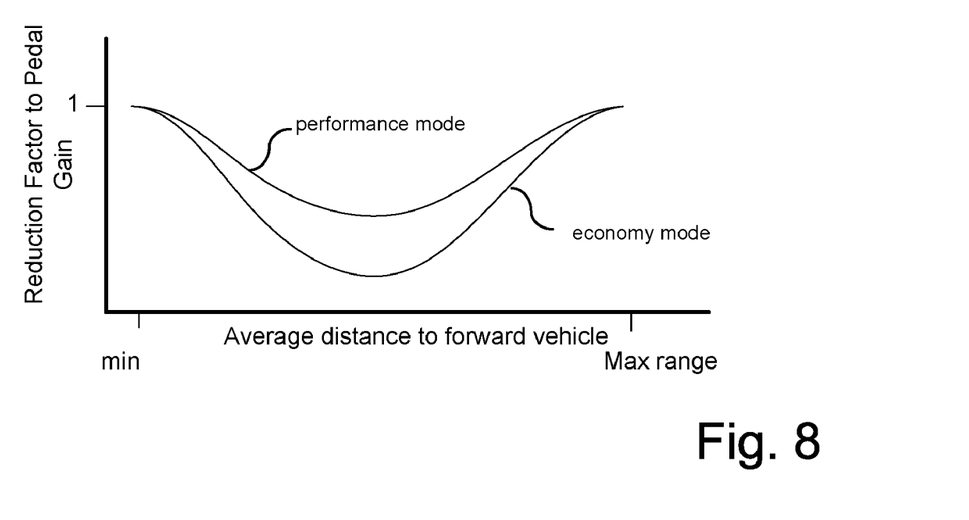

Referring now to FIG. 8, the adjustment to the pedal gain is illustrated via an adjustment (reduction) factor applied to the gain/transfer function. Specifically, FIG. 8 illustrates how the adjustment/reduction may vary depending on conditions such as a distance to a forward vehicle and a driver selected vehicle performance/economy mode. Again, this example illustrates one possible approach, and the x-axis may include various parameters, including a combination of an indication of traffic congestion, vehicle speed, distance to a forward vehicle, etc.

In this way, the pedal to vehicle response gain may be varied to provide a driver finer torque resolution at lower speeds when other vehicles are in close proximity, while still providing a high performance response during other operating conditions.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine of a vehicle in response to an operator pedal depression, comprising:
    during a first non-cruise control condition and at a first distance to a forward vehicle, adjusting an engine output in response to said pedal depression with a first relationship between the pedal depression and the engine output, with increasing pedal depression increasing the engine output from closed pedal to wide-open pedal; and
    during a second non-cruise control condition and at a second, greater, distance to a forward vehicle, adjusting the engine output in response to said pedal depression with a second relationship between the pedal depression and the engine output different from said first relationship, and with increasing pedal depression increasing the engine output from closed pedal to wide-open pedal, the first relationship and the second relationship each having the same maximum engine output for wide-open pedal, the first relationship having a lower gain near closed pedal, but having a higher gain near wide-open pedal, than the second relationship, the gain being a change in engine output for a change in pedal depression.

2. The method of claim 1 wherein said pedal depression is a foot pedal depression.

3. The method of claim 1 wherein said second non-cruise control condition includes a higher vehicle speed than said first non-cruise control condition.

4. The method of claim 1 further comprising adjusting said first and second relationships in response to a driver selectable performance or fuel economy mode, each of the driver selectable performance and the fuel economy mode yielding the same maximum engine output for wide-open pedal.

5. The method of claim 1 wherein said engine output includes an engine output torque, and said engine output torque is adjusted by varying at least one of a fuel injection amount and a valve timing.

6. The method of claim 1 wherein said engine output is adjusted by a throttle position of an electronically controlled throttle plate.

7. The method of claim 1 further comprising during a non-cruise control condition, adjusting the engine output in response to an operator speed set-point.

8. A control system comprising a non-transitory computer readable storage medium comprising instructions for controlling an engine of a first vehicle in response to an operator pedal input, the instructions configured to:
vary a relationship between a pedal position and an engine output in response to distance to a second vehicle, a vehicle speed of the first vehicle, and a driver selectable performance mode during non-cruise control conditions, the relationship having the same maximum engine torque for a wide-open pedal operator input at each of a first and second distance to the second vehicle.

9. The control system of claim 8 wherein the instructions are configured to vary said relationship to have a greater gain between a pedal motion and an engine torque during lower speed conditions where said distance is greater than a first threshold value and a driver has selected a higher performance mode than during lower speed conditions where said distance is less than a second threshold value and the driver has selected a higher fuel economy mode; and wherein the instructions are configured to vary said relationship to have a smaller gain between the pedal motion and the engine torque during lower speed conditions where said distance is less than the second threshold value and the driver has selected the higher fuel economy mode than during lower speed conditions where said distance is greater than the first threshold value and the driver has selected the higher performance mode.

10. The method of claim 1, wherein during the first non-cruise control condition, the first relationship provides a first gain between said pedal depression and an engine output at a first operator pedal input level between closed pedal and wide-open pedal and a second gain between said pedal depression and an engine output at a second operator pedal input level between closed pedal and wide-open pedal, and wherein during the second non-cruise control condition, the second relationship provides a third gain between said pedal depression and the engine output at the first operator pedal input level and a fourth gain between said pedal depression and the engine output at the second operator pedal input level between closed pedal and wide-open pedal, the third gain higher than the first gain and the fourth gain lower than the second gain, the second operator pedal input level closer to wide-open pedal than the first operator pedal input level.

11. A vehicle engine control method comprising:
during non-cruise control conditions, varying a relationship between a pedal position and an engine output in response to a distance to another vehicle and a driver-selectable performance mode, the relationship having the same maximum engine torque for a wide-open pedal operator input at each of a first and a second distance to the other vehicle, but having a lower gain near closed pedal position for closer distances than for farther distances to the other vehicle, the gain being a change in engine output for a change in pedal position.

12. A vehicle engine control method comprising:
during non-cruise control, varying a relationship between a pedal position and an engine output in response to a distance to another vehicle and a driver-selectable performance mode, the relationship having the same maximum engine torque for a wide-open pedal operator input at each of a first and a second distance to the other vehicle, but having a lower gain near closed pedal position in a fuel economy mode than a performance mode, the gain being a change in engine output for a change in pedal position.

13. A vehicle engine control method comprising:
during non-cruise control conditions, varying a relationship between a pedal position and an engine output in response to a distance to another vehicle and a driver-selectable performance mode, the relationship having the same maximum engine torque for a wide-open pedal operator input at each of a first and a second distance to the other vehicle, but having a higher gain near wide-open pedal for closer distances than for farther distances to the other vehicle, the gain being a change in engine output for a change in pedal position.

14. A vehicle engine control method comprising:
during non-cruise control conditions, varying a relationship between a pedal position and an engine output in response to a distance to another vehicle and a driver-selectable performance mode, the relationship having the same maximum engine torque for a wide-open pedal operator input at each of a first and a second distance to the second vehicle, but having a higher gain near wide-open pedal positions in a fuel economy mode than a performance mode, the gain being a change in engine output for a change in pedal position.

* * * * *